(12) United States Patent
Lee

(10) Patent No.: US 8,145,854 B1
(45) Date of Patent: Mar. 27, 2012

(54) METHOD AND APPARATUS FOR CONTROLLING AUTOMATED FOOD PREPARATION SYSTEMS

(76) Inventor: Rusty Shawn Lee, Berkeley, CA (US)

( * ) Notice: Subject to any disclaimer, the term of this patent is extended or adjusted under 35 U.S.C. 154(b) by 1328 days.

(21) Appl. No.: 11/759,252

(22) Filed: Jun. 7, 2007

Related U.S. Application Data

(60) Provisional application No. 60/804,175, filed on Jun. 8, 2006.

(51) Int. Cl.
*G06F 12/00* (2006.01)
(52) U.S. Cl. .......................................... 711/154; 99/325
(58) Field of Classification Search .................. 711/154; 99/325
See application file for complete search history.

(56) References Cited

U.S. PATENT DOCUMENTS

| | | | | |
|---|---|---|---|---|
| 2002/0171674 A1* | 11/2002 | Paris | .............................. | 345/700 |
| 2005/0256774 A1* | 11/2005 | Clothier et al. | .................. | 705/15 |
| 2006/0026048 A1* | 2/2006 | Kolawa et al. | .................... | 705/7 |

* cited by examiner

*Primary Examiner* — Hashem Farrokh
(74) *Attorney, Agent, or Firm* — Valauskas Corder LLC

(57) ABSTRACT

A method and apparatus are presented for automatically generating machine control instructions for controlling automated food preparation systems and equipment from ordinary recipes in natural language. The invention allows the sharing, remote execution, scheduling, and automatic ingredient ordering for such recipes to allow professional food preparation with little or no human intervention.

25 Claims, 2 Drawing Sheets

Scheduled recipes:

| | |
|---|---|
| 6:00pm 5/27/01 Pasta with pesto sauce | |
| 7:00am 5/28/01 Blueberry pancakes | |
| 5:00pm 5/28/01 Lasagna | |

Select a recipe:

| Entrees | Cakes | Blueberry pie | |
| Soups | Cookies | Apple pie [1] | |
| Salads | Pies > | Apple pie [2] | |
| Deserts > | Frozen Treats | Dutch apple pie | |
| Sides | Shakes | | |
| Appetizers | | | | smoothie

Find Recipe

9:00 AM  5 29 01

User Preferences

Schedule Recipe

Display Ingredient List

Execute Recipe

Print Shopping List

Purchase Recipe

Order Groceries

Add/Share New Recipe

Quit

FIG. 2

METHOD AND APPARATUS FOR CONTROLLING AUTOMATED FOOD PREPARATION SYSTEMS

CROSS-REFERENCE TO RELATED APPLICATIONS

This application claims priority to U.S. Provisional Patent Application Ser. No. 60/804,175, filed Jun. 8, 2006.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM, LISTING COMPACT DISC APPENDIX

Not Applicable.

BACKGROUND OF THE INVENTION

The present invention is related to robotic control systems, and more particularly to the control of automated food preparation systems.

Many types of automated food preparation systems have been developed over the last 50 years, from sandwich-making conveyor belt lines (U.S. Pat. No. 4,483,242 and U.S. Pat. No. 5,768,857) to automatic rice cookers (U.S. Pat. No. 5,156,082) to automatic bread makers (U.S. Pat. No. 5,839,356) to more general-purpose food preparation systems capable of multiple food preparation tasks (U.S. Pat. No. 4,919,950, U.S. Pat. No. 5,018,438 and U.S. Pat. No. 5,172,328), however such systems typically require specific instructions designed for that particular system or family of systems to generate a particular type of food. One cannot simply take a standard recipe out of a cookbook or off a web site and use it with these systems without human intervention. In addition, the machine instructions necessary to make a particular dish vary from system to system, so a specialized instruction file for one system will not work with another system from a different manufacturer, and a recipe that requires the capabilities of multiple types of food preparation systems cannot be accommodated by the current state-of-art.

BRIEF SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In accordance with one embodiment of the present invention is a computer system that uses an ordinary recipe file, written in natural language, such as that which one finds in a cookbook, and generates one or more machine-readable instruction files suitable for use with an automated food preparation system or a collection of automated food preparation equipment. The present invention can transmit or download these instructions to the automated food preparation equipment and interact with such equipment to ensure proper execution. This allows the present invention to use the vast number of pre-existing recipes publicly and commercially available to automatically cook or otherwise prepare the food specified in these recipes with little or no human intervention.

The present invention also allows the user to control the scheduling and execution of recipe preparation both locally and remotely, and can automatically predict and order needed ingredients for both scheduled recipes and recipes not yet scheduled based on prior history of usage.

BRIEF DESCRIPTION OF THE SEVERAL VIEWS OF THE DRAWING

The novel features believed characteristic of the invention are set forth in the appended claims. The invention itself, however, as well as other features and advantages thereof, will be best understood by reference to a detailed description of a specific embodiment which follows, when read in conjunction with the accompanying drawings, wherein:

FIG. 2 is a simplified drawing of the user interface for scheduling and executing recipes in the preferred embodiment.

DETAILED DESCRIPTION OF THE INVENTION

Figure 1:
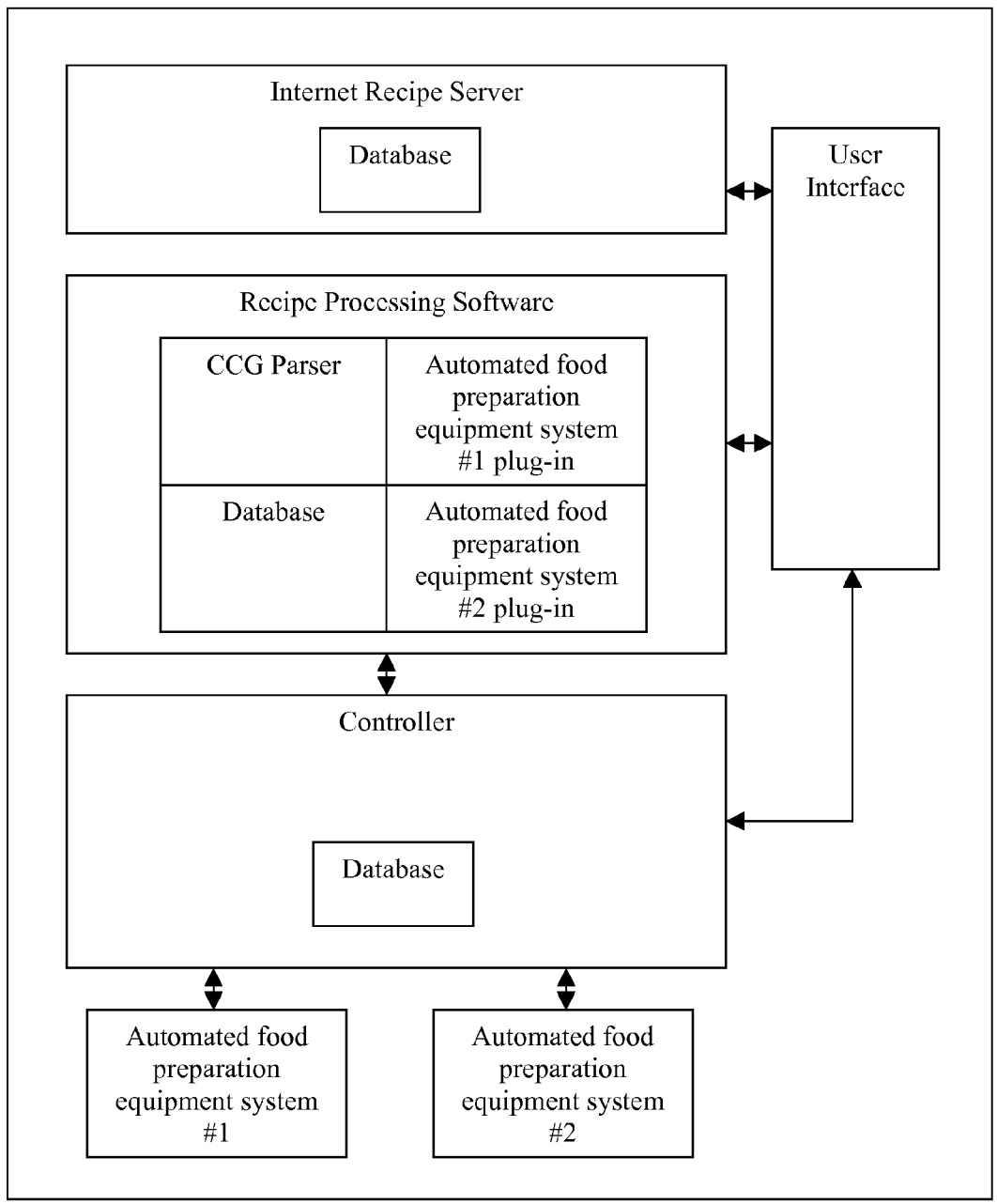
FIG. 1 is a system-level diagram of the components of the preferred embodiment and the interactions between those components.

The preferred embodiment of the present invention comprises a Recipe Processing Software process capable of converting recipes into machine-specific instructions for automated food preparation equipment, a Controller for executing those instructions and interpreting feedback from the automated food preparation equipment, a user interface, and a Internet Recipe Server for accessing, sharing, editing, and selling recipes, as shown in FIG. 1. The user interacts with the system through the user interface to schedule, execute, find, and otherwise transact with recipes. The user interface exchanges data with the Internet Recipe Server to search for, purchase, upload, and download recipes. The Internet Recipe Server uses a database to store and lookup recipes. The user interface invokes the Recipe Processing Software to read a recipe and determine the automated food preparation equipment to use and to generate the appropriate machine-specific instructions for each such piece of identified equipment. The user interface uses this information to invoke the Controller, which sends the generated machine-specific instructions to the appropriate pieces of automated food preparation equipment at the appropriate times and monitors feedback from such equipment. The Recipe Processing Software and Controller are described in more detail later below.

A user can request a specific recipe to be prepared either through a local user interface or remotely over the Internet through an identical user interface on the World Wide Web, as shown in FIG. 2. In both cases, the user interface will allow the user to customize or modify the recipe, schedule the preparation of the recipe for some point in the future, add and share new recipes over the Internet, and purchase additional recipes over the Internet. When scheduling a recipe for the future, the user may either specify the desired time the recipe should be ready by (in which case the system will automatically schedule the recipe to start before the desired ready time, by estimating the amount of time necessary to perform the recipe, using the parser described below and a database of estimated times of each food preparation operation) or the time at which recipe preparation should begin. In the preferred embodiment, all recipes are specified in natural language, although alternative embodiments can employ more compact machine-independent recipe representations. In one such alternative embodiment, recipes are instead specified in the Recipe Interchange Format (RIF) to make parsing recipes easier and simpler. A RIF file consists of a series of lines of text, where each line starts with one of the following commands: mix, bake, stir, heat, put, cool, or assign. Each command is followed by an optional time parameter and either an optional speed or optional temperature parameter for each command, followed by variables to apply the command to. These variables are used to represent physical objects or containers, and all initial ingredients are assigned to variables at the top of the file using the assign command. The assign command is a special case, which takes either one or two arguments: the first argument is the variable to assign a food item to, and the optional second argument is the ingredient or container to assign to that variable. If a second argument is not provided, the result of the last operation is instead assigned to that variable. For example, the commands, "mix V1 V2" and "assign V3" will mix together the ingredients assigned to the variables V1 and V2 and assign the mixture to the variable V3. The preferred embodiment is also capable of generating a recipe in the RIF format from natural language recipes, using the same parser described below for initial processing.

In an alternative embodiment, a remote telephony interface is also supported, allowing users to type in the first few letters of a desired dish or verbally state the name of the recipe via a speech-recognition interface. The interface will then verify the correct recipe by using a text-to-speech system to read the user a short description of the recipe followed by the full listing of the recipe. The user may confirm this recipe or search for alternative or similar recipes via a touchtone or voice command at any time during this process.

Once the user has executed or scheduled a recipe for preparation, the preferred embodiment of the present invention will display the necessary ingredients required for that recipe, as well as the current stores of ingredients contained in any connected food preparation systems. The user interface will invoke the controller to query connected food preparation systems for current inventories of ingredients, and will also maintain an independent record of quantities of ingredients ordered and quantities of ingredients used, to handle cases where such queries are not supported by the connected food preparation equipment. The user can also configure the system to automatically order any ingredients needed for all scheduled recipes over a specific time frame for delivery, by using the Internet, and can also automatically print a shopping list of all needed ingredients.

In addition, the system can be configured to predict the ingredients needed over a specified time frame even before some or any of the recipes scheduled for that time frame are entered into the system. This is accomplished by accumulating historical data of the user's recipe selection and using statistical analysis to extrapolate likely needed ingredients in the near future. In the preferred embodiment of the present invention, time-sensitive linear regression of all previously used ingredients over the past year is conducted, with weights of less recently used ingredients discounted by the square of the number of weeks since last usage. Ingredients for which the system predicts quantities needed below a user-specified tolerance level are ignored.

The system can also modify recipes automatically to accommodate specific user tastes and preferences. For example, if the user is trying to maintain a low-cholesterol or wheat-free diet, the user can configure the system to automatically substitute low-cholesterol or wheat-free versions of all ingredients, which the system will accomplish by using a remote database on the Internet Recipe Server that maps such ingredients to their substitutes, also adjusting the quantities if indicated by the database. The database can contain specific conditions for substitutions as well, for example making substitutions only if a dish is baked or in all recipes except those for cakes.

The Recipe Processing Software that converts natural language recipes to food preparation machine instructions begins by using a combinatorial categorical grammar parser to extract syntactic and semantic data from the natural language sentences in a recipe's text. The grammar used in the preferred embodiment is a standard English grammar augmented with constructs for parsing ingredient lists to extract the ingredients and quantities needed for a given recipe. The augmented constructs simply parse stand-alone noun phrase sentence fragments that are not part of any other sentence and begin with a quantity specifier (i.e. 6 oz milk, condensed). When an ingredient has a recipe for making that ingredient available either locally or on the Internet Recipe Server, at the user's option, the system will automatically parse and execute the recipe for making that ingredient before starting on the originally requested recipe. If this option is chosen by the user, the above-mentioned scheduling system and ingredient prediction system will also include these dependencies when calculating time or ingredients needed for any requested recipe. This allows dependent recipes to be automatically made when desired (for example, if the user desires fresh bread to be used as an ingredient in a recipe, the system can automatically make the bread first) and premade ingredients to be used otherwise (for example, if the user just wants to make a recipe as quickly as possible using store-bought bread). Alternative embodiments use grammars for other languages as well as grammars with other formalisms, such as tree adjoining grammars and head-driven phrase structure grammars.

When reading in units during parsing, all volumes are converted to milliliters and all masses are converted to grams internally, using a 64-bit floating-point representation. This allows the system to read in all common units of measurement, using both the British imperial system and metric, as well as any other measurement system added to the grammar. In cases where a unit name is ambiguous with regard to measurement system, the default measurement system for the current locality of the underlying operating system will be used unless otherwise specified by the user.

When parsing a sentence that is not an ingredient listing, the parser will identify known food preparation commands (such as mix, combine, bake, etc.) in the sentence and the roles of any arguments in that sentence using standard grammatical parsing techniques well known in the art of natural language processing (in the preferred embodiment, the CCG parser). Sentences with unknown commands are logged and ignored during execution, while unrecognized adjectives, adverbs, clauses, prepositional phrases, and other syntactic types are ignored and logged without affecting other processing of the sentences containing them. However, if a noun phrase that is not part of a parent prepositional phrase cannot be recognized by the parser, an error message is shown to the user and the user is asked to select whether to ignore the command, ignore just the noun phrase, or to abort operation completely. This behavior can be overridden by setting a user preference to default to one of these actions without alerting the user.

Each food preparation command has an entry in a local database containing rules for the semantic roles involved in conducting each command. The entry for the command "mix" contains a rule indicating that noun phrase objects of the sentence should be mixed together by a piece of food preparation equipment supporting the "mix" operation. It also contains rules indicating that prepositional phrases in the sentence with the command are used to place conditions on how the mixing must occur. Prepositional phrases of the form, "with X" will use X to perform the mixing operation when X is a utensil, tool, or other piece of equipment. When X is a food ingredient or product of previous operations, X will instead be mixed together with the other noun phrase object or objects of the sentence. The entry also contains a rule for handling adverbs in a sentence that apply to the command "mix", which adds parameters to the mixing process. The adverbs "slowly" and "quickly" cause the system to add a corresponding speed parameter to the appropriate mix command when executed on the automated food preparation equipment. The database entry for the command "combine" simply indicates to use the rules for the command "mix". The entry for the command "bake" contains a rule indicating that the noun phrase objects of the sentence should be heated to the temperature specified by a prepositional phrase in the sentence that contains a temperature, or to a default temperature if no temperature is specified in the sentence. The entry for the command "boil" operates in a similar manner, except that the noun phrase objects of the sentence are heated until a food preparation equipment sensor indicates a condition of "boiling". Many other useful commands are also easily apparent to one of ordinary skill in the art, in light of the above teaching, and are implemented using the same basic techniques taught above.

In the preferred embodiment, after a recipe is completely parsed, the software will then identify the appropriate automated food preparation equipment available for handling each specified operation in the recipe. Some operations may require simultaneous execution on more than one piece of equipment. For each operation, the software will generate one or more machine-specific control instructions for the selected automated food preparation equipment. When multiple pieces of automated food preparation equipment are capable of handling the same operation, the preferred embodiment of the present invention will pick the equipment that requires the least time to complete the desired operation, including any delays needed to wait for previous operations to complete and to transfer any necessary food components to that piece of equipment. This ensures that the system takes full advantage of unutilized equipment to reduce wait times. If multiple pieces of equipment will complete the desired operation in the same amount of time, the piece of equipment most recently used will be selected. In an alternative embodiment, the system will instead optimize for minimal equipment usage instead of time. In another alternative embodiment, the system will use linear optimization to schedule operations by solving the linear system simultaneously to reduce wait times.

The software will call the Controller to query each connected piece of equipment to determine what operations it supports, when that piece is initially connected to the system. In the event that a piece of automated food preparation equipment does not support this sort of query, the software will instead consult a database to determine this information.

In an alternative embodiment, appropriate equipment is identified and machine instructions are generated during parsing, allowing streaming of long recipes to occur so that the system does not have to complete downloading and parsing an entire recipe before beginning to execute it on the automated food preparation equipment.

In the course of generating instructions to carry out various operations, ingredients and processed items will often need to be moved either within a piece of equipment or from one piece of equipment to another, for example, to move an item that has been mixed in one compartment to be heated in another compartment. The software will identify when this needs to occur based on a pre-existing database with physical location data for each utilized piece of equipment. This database includes the location and dimensions of each compartment where a food preparation operation can take place, as well as any commands needed to open, close, load, or remove an item from that compartment. The software will keep track of the current location of every movable item and piece of equipment in the system and generate machine-specific control instructions for each time an item or piece of equipment needs to be moved. For some machines, this will simply be multidimensional coordinate positional data, but for others it requires generating instructions that create specific electromagnetic pulse signals for stepper motors or servos. The software will determine that an item needs to be moved if it is currently (at that point in the instruction sequence) not in the appropriate compartment of the food preparation equipment selected for performing the desired food preparation operation. In the case where a piece of movable food preparation equipment was selected to perform the desired operation, the software will instead direct the food preparation equipment to move to the current location of the item to be processed, or to an intermediate location suitable for performing the operation (where the food item is also moved, if necessary), if such a location is specified in the database.

To generate an instruction for a specific piece of automated food preparation equipment, the software will call a plug-in module written for that piece of equipment to determine what machine-specific instructions to generate for a given desired operation. Support for new automated food preparation equipment can be added by writing new plug-ins to this software. In the preferred embodiment of the present invention, each plug-in module looks up the entry for the desired operation in a built-in database to determine the corresponding machine-specific instructions to generate. Each database entry contains the format and parameter structure for a given food preparation operation (such as mix, bake, etc.) and rules for mapping the semantic machine-independent arguments and temperature and speed settings to that parameter structure. In an alternative embodiment, this database lookup is bypassed when plug-ins instead have a specific function to perform a given processing operation, allowing heuristics to be used instead of database lookups when desired.

For example, the software needs to bake an item in response to the parsed sentence, "Bake at 400° F. for 30 minutes or until golden brown." The parser identifies the word "bake" as a command for cooking in an enclosed environment and determines that an automated oven is the best piece of equipment to carry out this command. The parser also identifies the prepositional phrases to indicate the temperature to bake at and the condition to stop baking (which in this case is a conjunction of two prepositional phrases: after 30 minutes or when oven sensors detect golden brown). Conjunctions such as "and" and "or" are handled using standard Boolean logic. The software will call its automated oven plug-in, which will generate a series of machine-dependent instructions to load an item into the oven and to raise the temperature to 400°. The software will also generate instructions to cause the oven to provide feedback data of the current condition of the item from the oven sensors, so that the Controller will know when to proceed to the next machine-dependent instruction, which tells the oven to turn off and unload the item. The Controller will wait until either 30 minutes have passed or until the oven sensors detect that the item is golden brown before executing these instructions. "Golden brown" is a specific condition stored in a database in an entry indicating the sensor output ranges that correspond to this condition.

In the preferred embodiment of the present invention, supported conditions include "brown", "golden brown", "black", "warm", "hot", "cold", "frozen", "boiling", "melted", and "dissolved" although many more are possible and easily envisioned by one skilled in the art in light of the above teachings. Temperatures in both Celsius and Fahrenheit are supported and times may be specified in seconds, minutes, or hours and fractions thereof.

The software will also generate machine-dependent instructions for each piece of equipment, in order to clean that equipment after all other instructions for that equipment have been completed, if the equipment supports self-cleaning instructions.

In an alternative embodiment of the present invention, instead of generating machine-dependent control instructions directly, the software will generate machine-independent intermediate instructions, such as those for the RIF format described previously. These can be post-processed by users, other pieces of software, or automated food preparation equipment that can handle such an intermediate format.

In the preferred embodiment of the present invention, the Controller for executing recipes on the automated food preparation systems and for interacting with those systems is a software program running on a computer system that can interface with all available automated food preparation systems. The interface between the Controller and each system can be an Ethernet connection, USB connection, Wi-Fi connection, Bluetooth connection, or any other peripheral interface supported by the underlying hardware. The interface can also utilize high-level protocols such as TCP/IP when low-level transport details are handled by the underlying operating system or hardware.

When preparing a recipe, the Controller sends the generated instructions over the appropriate interface to the specified automated food preparation equipment. Some automated food preparation equipment requires sending one instruction at a time, while other pieces of equipment can handle blocks of instructions at once. For some equipment, these "instructions" are simple electromagnetic pulses directly used to control individual motors or servos in the equipment, while for others they are microcontroller instructions or other higher-level machine control instructions. The Controller determines these capabilities from a database, or from querying equipment that supports such queries. The Controller is also capable of sending instructions to multiple pieces of equipment at once, when the software has determined either that simultaneous execution is necessary or that the instructions are independent. The Controller also prompts the user when processing any instructions that require human assistance—for example, asking someone to insert a specific ingredient into a container.

The Controller also monitors feedback from all of the connected automated food preparation equipment to ensure that all systems are behaving as expected. If any feedback parameters exceed pre-specified tolerance levels, for example a temperature sensor indicates an item is at 450° F. when it is only supposed to be at 400° F., the system will halt and alert the user. In an alternative embodiment, the system will instead attempt to correct the problem and continue (but will still alert the user). In the above example, this alternative embodiment of the system would send machine-dependent commands to the affected equipment to lower the temperature or turn off the equipment, instead of halting the entire instruction sequence.

The foregoing description of the preferred embodiment and select alternative embodiments of the invention has been presented for the purposes of illustration and description. It is not intended to be exhaustive or to limit the invention to the precise forms disclosed. Many modifications and variations are possible in light of the above teaching.

I claim:

1. A method for controlling one or more automated food preparation systems, the method comprising the steps of:
    parsing one or more commands in a recipe by automatically extracting a list of ingredients and one or more measurements for the ingredients required for the recipe;
    automatically determining one or more pieces of equipment needed to fulfill the one or more commands;
    automatically generating one or more sequences of instructions for the one or more automated food preparation systems to control the one or more pieces of equipment;
    automatically transmitting the one or more sequences of instructions to the one or more automated food preparation systems;
    monitoring the execution of the one or more sequences of instructions on the one or more automated food preparation systems; and
    automatically creating any additional instructions necessary to ensure proper execution of the one or more sequences of instructions on the one or more automated food preparation systems.

2. The method of claim 1, wherein the one or more commands are sentences in natural language.

3. The method of claim 1, further comprising the step of obtaining the recipe over the Internet.

4. The method of claim 1, wherein the one or more sequences of instructions are sent to multiple automated food preparation systems simultaneously.

5. The method of claim 1, further comprising the step of prompting a user when the one or more sequences of instructions requires human assistance.

6. The method of claim 1, further comprising the step of automatically customizing the recipe to meet one or more nutritional constraints of a user.

7. The method of claim 1, further comprising the step of executing said method of claim 1 on any dependent recipes.

8. The method of claim 1, further comprising the step of automatically ordering any ingredients needed for scheduled recipes.

9. The method of claim 1, further comprising the steps of:
    predicting any ingredients needed over a specific time period;
    automatically ordering any needed ingredients over the Internet.

10. The method of claim 1, further comprising the step of scheduling the execution of the one or more sequences of instructions according to a schedule based on user input.

11. The method of claim 1, further comprising the steps of:
    tracking the current position of each group of food items;
    automatically determining when each group of food items needs to be moved from one piece of equipment to another piece of equipment to correctly fulfill the one or more commands in the recipe;
    automatically generating any necessary instructions to move each group of food items from one piece of equipment to another piece of equipment to fulfill the one or more commands in the recipe.

12. The method of claim 1, wherein said automatically generating step further comprises the step of optimizing the one or more sequences of instructions according to an optimization criteria.

13. The method of claim 1, further comprising the step of estimating a preparation time of the recipe.

14. The method of claim 1, wherein said automatically determining step further includes the step of querying the one or more pieces of equipment to determine which of the one or more commands the one or more pieces of equipment supports.

15. The method of claim 1, further comprising the step of specifying by the user one or more recipes for preparation by talking into a speech interface.

16. A food processing system for making prepared meals, comprising:
- a means for parsing machine-independent recipes from a knowledge base comprising one or more recipes;
- a means for converting recipes into one or more sequences of one or more instructions for one or more pieces of automated food preparation equipment;
- a means for selecting an appropriate automated food preparation system to use for the one or more sequences of one or more instructions;
- a means for transmitting the one or more sequences of one or more instructions to the appropriate automated food preparation equipment at designated times to achieve preparation of a selected recipe from the knowledge base.

17. The system of claim 16, further comprising a means for automatically ordering one or more ingredients over the Internet needed for the selected recipe.

18. The system of claim 17, further comprising a means for predicting the one or more ingredients needed for a future period of time.

19. The system of claim 16, further comprising a recipe server for performing one or more selected from the group of accessing, sharing, editing, and selling recipes over the Internet.

20. The system of claim 16, further comprising a means for preparing any dependent recipes needed for the selected recipe.

21. The system of claim 16, further comprising a means for monitoring and reacting to feedback from the appropriate automated food preparation equipment.

22. The system of claim 16, wherein the one or more sequences of one or more instructions are transmitted in parts at appropriate times to achieve preparation of the selected recipe.

23. The system of claim 16, wherein the one or more sequences of one or more instructions are generated and transmitted in a manner that optimizes the generation and the transmission according to an optimization criteria.

24. The system of claim 16, further comprising a means for customizing the selected recipe according to one or more user-defined criteria.

25. The system of claim 16, wherein the machine independent recipes comprise recipes in natural human language.

* * * * *